United States Patent Office 2,713,584
Patented July 19, 1955

2,713,584
METHOD OF ISOLATING CHLOROPHYLL CONSTITUENTS OF PLANT MATERIAL

Ole Gisvold, Ramsey, Minn.

No Drawing. Application February 18, 1952,
Serial No. 272,255

12 Claims. (Cl. 260—314)

The present invention relates to a process for recovering chlorophyll from the expressed juice of the alfalfa plant. In the drying of alfalfa the process of reducing the alfalfa to small particle size for drying, results in the squeezing out of a considerable amount of juice which has heretofore been discarded. It has now been discovered that it is possible to recover chlorophyll in satisfactory purity from this expressed juice.

It is therefore an object of the present invention to provide a novel process of recovering chlorophyll from alfalfa juice.

It is also an object of the present invention to provide a novel product derived from alfalfa juice and containing chlorophyll.

In the preliminary processing of alfalfa, the alfalfa in the field is chopped into lengths of approximately 1 inch. In the drying plant the material is then run through a hammer mill which serves to bruise and crush the material, without greatly reducing it in size. The bruised and crushed material is then fed between rolls which squeeze out a considerable amount of juice carrying a great deal of green coloring matter (including chlorophyll), after which the stem and leaf material is passed through a drier for the production of alfalfa meal.

In the recovery of the chlorophyll from the expressed juice the juice is first heated to an elevated temperature, for example from 60 to 70° F., at which temperature the chlorophyll bearing material is coagulated. This coagulated material is then separated off. As an aid in the separation of the coagulated material and for subsequent steps it is preferred to introduce filter cell in the expressed juice, either before coagulation or before filtration.

The coagulated chlorophyll material is then subjected to an extraction process. The coagulated material is contacted with a variety of organic solvents having certain characteristics. The solvent must first have a reasonable capacity for dissolving chlorophyll. Second, it must be water immiscible. Third, the solvent must be one in which the alkali metal chlorophyllins are not soluble. For this purpose a variety of solvents may be employed. A variety of water immiscible aliphatic ketones, having from 5 to 8 carbon atoms, such as diethyl ketone, methylbutyl ketone and the like may be employed. Those having less than 5 carbon atoms are too miscible with water to be satisfactory. Those having more than 8 carbon atoms do not have satisfactory capacity of dissolving the chlorophyll and also involve problems in the recovery of the solvent. Aliphatic alcohols containing from 6 to 8 carbon atoms may be employed. These include hexanol, heptanol and octanol, either the normal alcohols or branched alcohols. Amyl alcohols have an appreciable solubility for the alkali metal chlorophyllins, as will be shown hereinafter, and accordingly are not preferred as the primary solvent.

Aliphatic ethers containing from 4 to 8 carbon atoms are also useful as solvents. These include diethyl ether, isopropyl ether, dibutyl ether, ethylhexyl ether, ethylpropyl ether and the like. These are less satisfactory from the standpoint of fire hazard.

Halogenated aliphatic hydrocarbons may also be used, such as ethylene dichloride, trichlor ethylene, tetrachlor ethylene, chloroform and the like. Aliphatic hydrocarbons, such as hexane, heptane and octane may likewise be used for extracting the chlorophyll. Of the solvents mentioned above the more strongly polar solvents, such as the alcohols and ketones are preferred as they are more effective in extracting the chlorophyll out of the water-wet protein complex.

In extracting the coagulated chlorophyll material the extraction may be made directly upon the coagulated material, but it is preferred initially to wet the coagulated material with a water miscible solvent, such as methyl, ethyl or propyl alcohol or acetone. As an alternative the water miscible solvent referred to above can be included in the selected primary solvent. For example, the primary solvent may be composed of 90% of the desired primary solvent and 10% of the water miscible solvent. The extraction may be made either in the cold or with gentle warming (up to 50 or 60° C.)

The extract is then separated from the residual solids and the extract containing the dissolved chlorophyll ingredient is then saponified with a solution of an alkali metal hydroxide in aqueous alcohol. This saponification is effected in a short period of time and at a low temperature to saponify the two carboxyl groups of the chlorophyll without excessive saponification of fats also contained in the extract. Accordingly, the saponification is effected in an aqueous alcoholic KOH or NaOH solution. A suitable solution is a 30% KOH solution in a mixture of 6 parts methanol and 1 part water. Other alcohols may be used in place of methanol. Suitable alcohols include ethanol, propanol, glycerol, ethylene and propylene glycols and the like. By the use of these conditions suitable saponification of the chlorophyll can be effected in a few minutes, for example 1 to 5 minutes, at room temperatures.

After saponification, the two phases (the aqueous phase and the water immiscible solvent phase) may be separated in any of the usual ways, as by decantation, centrifugation and the like. The aqueous phase may be the upper or lower phase, depending upon the specific gravity of the water immiscible solvent. The water immiscible solvent phase contains the carotenoid pigments, such as the xanthophylls, carotene, fats, etc. which may be separately recovered. The alkali metal salts of the chlorophyll are present in the aqueous alcohol layer and may be recovered therefrom in either of two ways:

First, the aqueous alcoholic alkaline solution containing the alkali metal chlorophyllins is extracted with a water immiscible solvent which is a solvent for the alkali metal chlorophyllins. Normal butanol is very well adapted for this purpose. Normal amyl alcohol and iso-amyl alcohol may be used but are more toxic and accordingly less desirable from that standpoint. The addition of the n-butanol results in the transfer of the chlorophyllin salts to the butanol solution.

The mixture is diluted with water and acetic acid. A soluble copper salt, such as copper sulfate or copper acetate is also added. The acetic acid and the copper salt result in the substitution of copper for the naturally occurring magnesium in the chlorophyll molecule to produce the more stable alkali metal salts of the copper chlorophyllins. The dilution with water makes the later phase separation more distinct. After the water, acetic acid and copper salt have been added, the mixture is heated and stirred at 60 to 70° C. for about 20 minutes. The mixture is then allowed to separate into two layers, the lower layer being discarded. The butanol layer is then washed with several portions of water in order to remove excess acids and salts. The butanol may then be evaporated off and recovered, if desired, to leave the solid copper chlorophyllin as a residue. This solid contains principally copper chlorophyllin plus some fatty material. The product may be further purified by washing with an organic solvent such as petroleum ether or some other suitable solvent for the removal of fat material. The solid copper chlorophyllin remaining may then be mixed with water and agitated with sodium or potassimum hydroxide solution until a pH of 7 to 7.2 is obtained. This yields an aqueous solution of potassium or sodium copper chlorophyllin from which the solid salts may be recovered by evaporation of the water, preferably under vacuum.

As an alternative method the butanol extract may be washed with water to remove excess alkali before the addition of the acetic acid and the copper salts. Thereafter, to the butanol solution there may be added the acetic acid and the copper salt and the product worked up in the manner described. In this alternative procedure the intermediate washing step removes not only excess alkali, but also any soaps of hydrolyzed fat. Accordingly, the product obtained by evaporation of the butanol is of greater purity. The first method may necessitate the ultimate solvent washing step described above for this reason.

By way of further illustrating the invention, but without limitation thereon, reference is made to the following example:

Example

To 250 gallons of alfalfa juice prepared as described above and containing from 10% to 20% solids, there is added filter cell in the amount of 40 pounds. The mixture is then heated to 60 to 70° C. for about 10 minutes. During this heating period the chlorophyll-protein complex coagulates. The mixture is then agitated and filtered to collect the filter cell and coagulated chlorophyll-protein complex. This may be accomplished in a filter press, centrifuge or by other means. Approximately 400 pounds of the precipitated complex are obtained.

The complex is then extracted with about 100 gallons of methyl isobutyl ketone containing about 10% methanol. The extract is then separated from the residual insoluble material. The separated extract is mixed with about 5 gallons of a 30% solution of potassium hydroxide in a mixture of 6 parts of methanol and one part of water. The saponification reaction is allowed to continue, usually, for about a minute before the two phases are separated. The mixture is then allowed to stand and the aqueous alkaline solution is withdrawn. The aqueous alkaline solution is then mixed with 25 to 50 gallons of normal butanol and the mixture is washed with water to remove excess alkali. The water phase is removed and the butanol solution is acidified with acetic acid. Five gallons of water are then added, the water containing sufficient copper sulfate to convert the magnesium chlorophyllins to copper chlorophyllins. The mixture is then heated and stirred at 60 to 70° C. for about 20 minutes. The mixture is then allowed to subside and the lower aqueous layer is withdrawn and discarded. The butanol layer is then washed with three separate batches of water in order to remove excess acids and solids. Thereafter, the butanol is distilled off under vacuum at about 15 to 20 mm. pressure. The residual solids contain the copper chlorophyllins and a slight amount of fatty material. The solids may then be washed with petroleum ether to extract the fat and leave the solid copper chlorophyllins. The solid copper chlorophyllins are then mixed with water and agitated while an aqueous solution of sodium or potassium hydroxide is added until a pH of 7 to 7.2 is obtained. The solid salts may be recovered by distilling the water off under vacuum.

The overall process herein described has been very effective for recovery of the chlorophyllin salts. It will be appreciated, however, that many of the steps are optional. Thus, the essence of the process is the preparation of a solution of the chlorophyll in a water immiscible solvent in which the chlorophyllin salts are insoluble, the selective saponification of ester groups on the chlorophyll (contained in the water immiscible solvent) without appreciable saponification of fat, and finally the extraction of the saponification reaction mixture with a solvent in which the chlorophyllin salts are soluble.

Additional steps make the process commercially desirable but are not absolutely essential to the process. These additional steps include such steps as the wetting of the coagulate with a water miscible solvent prior to extraction, the conversion of the product to copper chlorophyllins, the washing of the product and similar steps.

What I claim is:

1. Process of recovering chlorophyll from alfalfa juice which comprises warming such juice to coagulate the chlorophyll and associated materials, separating the coagulate from the remainder of the juice, extracting the coagulate with a water immiscible organic solvent in which the chlorophyll is soluble and in which alkali metal chlorophyllins are insoluble, said solvent being selected from the group consisting of aliphatic ketones containing from 5 to 8 carbon atoms, aliphatic alcohols containing from 6 to 8 carbon atoms, aliphatic ethers containing from 4 to 8 carbon atoms and aliphatic hydrocarbons and chlorinated hydrocarbons, separating the resultant extract from the residue, selectively saponifying by means of an aqueous alkaline medium the ester group of the chlorophyll in the extract to form chlorophyllin salts without appreciable saponification of associated fats, separating the aqueous medium from the residual water immiscible solvent medium, extracting the aqueous medium with an aliphatic alcohol containing 4 to 5 carbon atoms and removing the solvent from said last mentioned extract to recover the chlorophyllin salts.

2. Process according to claim 1 in which the selective saponification of the chlorophyll ester groups is effected by means of aqueous methanolic alkali at approximately room temperature.

3. Process according to claim 1 in which the chlorophyllin salts are reacted with acetic acid and a water soluble copper salt to convert the chlorophyllin salts to copper chlorophyllin salts before recovery of the chlorophyllin salts.

4. Process of recoverying chlorophyll from alfalfa juice which comprises heating alfalfa juice to approximately 60 to 70° F. to coagulate the chlorophyll and associated materials, separating the coagulate from the remainder of the juice, extracting the coagulate with methyl isobutyl ketone in the presence of methanol, separating the resultant extract from the residue, saponifying the extract with aqueous methanolic alkali at approximately room temperature to saponify the ester groups of the chlorophyll to form chlorophyllin salts without substantial saponification of associated fats, separating the aqueous phase from the ketone phase, extracting the aqueous phase with n-butanol and recovering the chlorophyllin salts from the butanol extract.

5. Process according to claim 4 in which the butanol extract is acidified with acetic acid and a water soluble copper salt is added to produce copper chlorophyllin and thereafter the butanol is evaporated to recover the copper chlorophyllin.

6. Process according to claim 4 in which the butanol extract is acidified, a water soluble copper salt is added to produce copper chlorophyllin, the extract is washed with water, the butanol is evaporated and the residual copper chlorophyllin is washed with a fat solvent.

7. Process according to claim 4 in which the butanol extract is washed with water, acetic acid and a water soluble copper salt are then added to produce copper chlorophyllin and the butanol is then evaporated to recover the copper chlorophyllin.

8. Process of producing chlorophyllin salts from a solution in a water immiscible solvent containing chlorophyll, carotene, xanthophyll and related materials, which comprises saponifying the ester groups of the chlorophyll with an alkaline alcoholic solution in an aqueous medium at a temperature not substantially exceeding room temperature to form chlorophyllin salts, without appreciable saponification of fats, separating the water immiscible solvent phase from the aqueous medium, extracting the aqueous phase with an aliphatic alcohol containing 4 to 5 carbon atoms and recovering the chlorophyllin salts from the alcoholic extract.

9. Process of producing chlorophyllin salts from a methyl isobutyl ketone solution containing chlorophyll, carotene, xanthophyll, fat and the like, which comprises saponifying the chlorophyll by means of aqueous methanolic alkali at approximately room temperature to convert the chlorophyll to chlorophyllin salts without appreciable saponification of fat, separating the aqueous phase from the ketone phase, extracting the aqueous phase with n-butanol and recovering the chlorophyllin salts from the butanol extract.

10. Process according to claim 9 in which the butanol extract is washed with water, after which acetic acid and a water soluble copper salt are added to the butanol extract to convert the chlorophyllin salt to copper chlorophyllin, after which the butanol extract is again washed with water and the butanol evaporated to recover the copper chlorophyllin.

11. Process according to claim 9 in which the butanol extract is treated with a dilute acetic acid solution and a water soluble copper salt, the mixture is then heated to 60 to 70° C. for about 20 minutes, the butanol phase is then separated and washed with water and the butanol evaporated to recover the copper chlorophyllin.

12. Process of producing chlorophyllin salts from a solution in a water immiscible solvent containing chlorophyll, carotene, xanthophyll and related materials, which comprises saponifying the ester groups of the chlorophyll with an alkaline alcoholic solution in an aqueous medium at a temperature not substantially exceeding room temperature to form chlorophyllin salts, without appreciable saponification of fats, separating the water immiscible solvent phase from the aqueous medium, and recovering the chlorophyllin salts from the aqueous medium.

References Cited in the file of this patent

UNITED STATES PATENTS

| | | |
|---|---|---|
| 1,953,607 | Holmes et al. | Apr. 3, 1934 |
| 2,131,394 | Test | Sept. 27, 1938 |
| 2,274,102 | Snyder | Feb. 24, 1942 |
| 2,394,278 | Wall et al. | Feb. 5, 1946 |

OTHER REFERENCES

Kunz et al., Ber. Deut. Chem., vol. 58B, pp. 1868–76 (1925).